Sept. 22, 1959     C. E. MARKHAM     2,905,790
SPACE THERMOSTAT WITH ADJUSTABLE ANTICIPATOR
Filed March 25, 1957
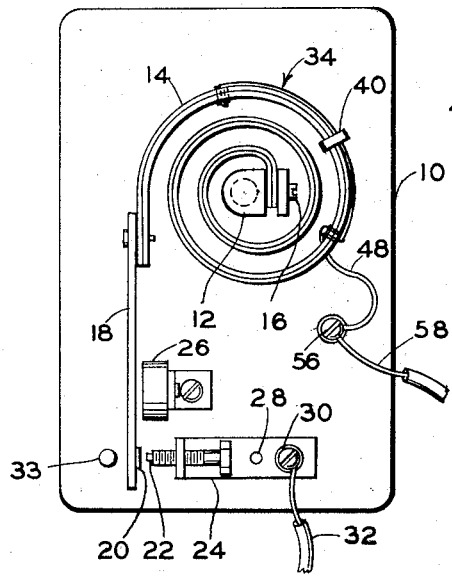
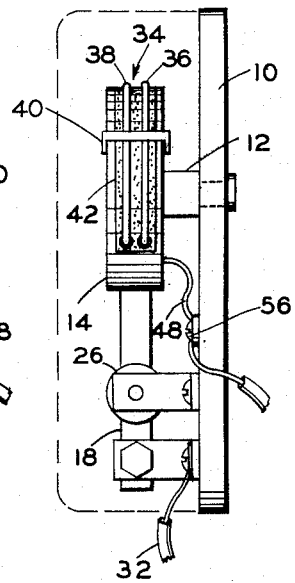
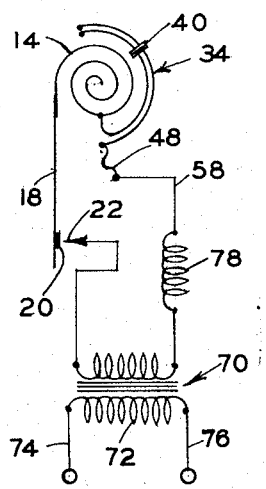
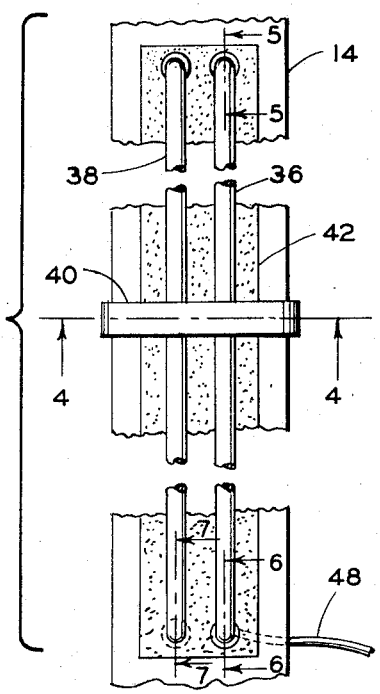
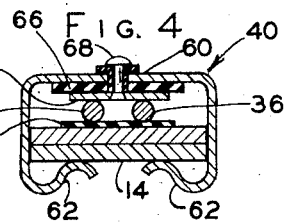
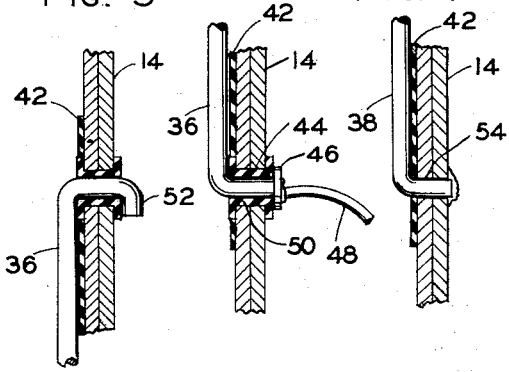
INVENTOR
Charles E. Markham United States Patent Office 2,905,790
Patented Sept. 22, 1959

2,905,790

SPACE THERMOSTAT WITH ADJUSTABLE ANTICIPATOR

Charles E. Markham, Affton, Mo., assignor to White-Rodgers Company, St. Louis, Mo., a corporation of Delaware Application March 25, 1957, Serial No. 648,173

6 Claims. (Cl. 200—122)

This invention relates to space thermostats and particularly to means for locally heating the temperature sensitive element of a space thermostat in accordance with requirements.

In conventional heating systems wherein the furnace is operated intermittently at full capacity under control of the space thermostat, more heat is usually produced during each cycle of furnace operation than is required to replace the heat loss from the heated space during the "off" cycle. This is due in part to lag in response of the thermostat and in part to the unavoidable storage of some heat in the furnace during the operation cycle, and which, when delivered to the space after the thermostat responds to stop production of heat, causes "overshooting" of the preselected space temperature.

There has been long and extensive use of means in the form of a small electrical resistance heating element, called an "anticipator," placed adjacent the thermostatic element for heating it slightly during operation of the furnace when the thermostat is in a closed, heat demanding position so as to effect the opening of the thermostat to cut off operation of the furnace at some time prior to the time when sufficient heat is delivered to the space to heat it to the preselected temperature. In this manner the temperature change required to effect operation of the thermostat from closed to open circuit position is supplied in most part by this local heating, and if this local heat is applied in the correct amount and at the correct rate so as to "anticipate" the "overshoot," furnace operation will be cut off at just the right moment before the selected space temperature is reached, so that the stored heat in the furnace when subsequently delivered to the space will be just sufficient to heat the space to the preselected temperature.

The application of local heat to the space thermostat for the above purpose is extremely critical, and if the method of application is such that any residual heat remains therein to accumulate during successive "off" cycles, it will have the effect of lowering the temperature setting of the thermostat, which results in a so-called "drooping" of the control point below that which has been preselected. It is essential, therefore, to apply this local heat to the temperature sensitive element of the thermostat as directly as possible so that the amount of heat required to be produced may be limited to just the amount needed, and it is also essential to reduce the mass or heat storage capacity of the heating means to a minimum, thereby to reduce residual heat to a minimum.

It would appear from this, therefore, that in the case of a thermostat employing a bimetallic strip element, the best arrangement would be to connect the bimetallic strip in series in the control circuit and construct the element so that it would have the required electrical resistance for self-heating the correct amount. However, this arrangement has the obvious disadvantage of imposing limitations on the design and construction of the thermostatic element for its primary purpose and, moreover, if it is desirable to vary the local heating of the thermostat in order to compensate for varying degrees of "overshooting," or to provide a thermostat which is universally adaptable for use in control circuits having different electrical loads and, therefore, current requirements, it becomes necessary to provide some means of varying the resistance of the local heating means, whether it be the bimetallic strip itself or an adjacently mounted resistance heater.

The primary object of this invention is to provide a generally new and improved anticipating space thermostat of the bimetallic strip type which is universally adaptable for use in heating control circuits having different electrical loads and which may be conveniently adjusted to "anticipate" the space heating rate of a particular heating system.

A further object of the invention is the provision of a space thermostat of the bimetallic strip type having a variable electrical resistance type anticipating heater which is constructed and arranged so as to have a minimum of heat storage capacity and so as to supply heat to the bimetal strip directly to an extensive area of the strip intermediate of its ends.

Further objects and advantages will appear from the foregoing description when read in connection with the accompanying drawing.

In the drawing:

Fig. 1 is a front elevational view of a bimetallic coil type thermostat having an anticipating heater constructed in accordance with the present invention;

Fig. 2 is a right side elevational view of the thermostat and anticipating heater shown in Fig. 1;

Fig. 3 is an enlarged fragmentary view of the bimetal coil showing the method of attaching the resistance heater wires thereto;

Fig. 4 is a cross-sectional view through the slidable shorting bar and is taken on line 4—4 of Fig. 3;

Fig. 5 is a cross-sectional view showing the method of attaching the insulated ends of the resistor wires to the bimetal strip and is taken on line 5—5 of Fig. 3;

Fig. 6 is a cross-sectional view showing the pigtail connection to an insulated end of one of the resistor wires and is taken on line 6—6 of Fig. 3;

Fig. 7 is a cross-sectional view showing the mechanical and electrical connection of another end of the resistance heater wire and is taken on line 7—7 of Fig. 3; and Fig. 8 is a simplified diagram of a conventional heating control system including the thermostat and anticipating heater.

Referring to the drawing, the thermostat includes a base 10 of insulating material. Mounted on the base 10 by means of a stud 12 is a spirally wound bimetal coil 14. The inner end of the coil 14 is rigidly attached to the stud 12 by a screw 16, and at its outer free end, the coil carries attached thereto a contact arm 18 of magnetic material. The arm 18 carries a contact 20 at its outer end which cooperates with an adjustable stationary contact 22 mounted on a conductive bracket 24 to control a circuit. The bimetal coil is constructed so that the free outer end thereof and the attached arm 18 move inward toward stationary contact 22 when the coil responds to decreasing temperature.

The coil mounting stud 12 may be mounted for rotation in the base 10 so that the relationship of contacts 20 and 22 may be adjusted by slight rotational movements of the stud, and any means, such as a thumb knob (not shown), may be employed which has a direct connection with the stud or has an operative connection therewith through any suitable motion multiplying means such as cam or gear means to facilitate slight accurate adjustments of the contacts.

A permanent magnet 26 mounted on the base 10 acts to attract arm 18 as it is moved toward the magnet, thereby to provide a snap action closing movement of the contacts 20 and 22 and so as to provide adequate contact pressure at all times when the contacts are closed. The conductive bracket 24 is attached to the base 10 by a rivet 28, and a terminal screw 30 threadedly engaged in the bracket is provided for the connection of a circuit lead 32. Stop means in the form of a pin 33 mounted in the base 10 is provided to limit the outward swing of the contact arm 18.

Mounted on the outer turn of the bimetal coil is a resistance heater, generally indicated at 34, comprising a pair of parallel wires 36 and 38 lying against the arcuate outer surface of the bimetal and a slidable shorting bar 40 arranged for sliding adjustment along the pair of wires. The wires 36 and 38 are electrically insulated from the bimetal by any suitable means which will provide a practical minimum of resistance to heat transfer between the wires and the bimetal. Inasmuch as the usual total voltage drop in conventional heating control circuits is in the order of 24 volts, and the temperature to which the wires 36 and 38 will be heated is relatively low, a thin coating of commercial insulating varnish has been found to be entirely adequate. The wires 36 and 38 may, therefore, be considered to be substantially in heat conducting relationship with the bimetal strip. Presently, however, for purposes of illustration, I employ a strip of thin insulating tape 42 cemented to the outer surface of the bimetal.

The lower end of wire 36 is attached to the bimetal by forming it at a right angle and passing it through an aperture 44 in the bimetal, as indicated in Fig. 6. The projecting end of the wire is provided with a head 46 soldered thereto, and attached to the head 46, as by soldering, is a pigtail lead 48. An insulating grommet 50 is provided to insulate the wire portion extending through aperture 44. The upper ends of wires 36 and 38 are attached to the bimetal in a manner to insulate them from the bimetal, as shown in Fig. 5. The manner of attachment of the upper ends of wires 36 and 38 is similar to that of the attachment of the lower end of wire 36, except that the upper ends of wires 36 and 38 are crimped over, as indicated at 52, after passing through apertures in the bimetal instead of being provided with a head 46. The lower end of wire 38 is not, however, insulated from the bimetal, but is attached by being formed over and passed through an aperture 54 in the bimetal and anchored by a blob of solder so as to be electrically as well as mechanically connected to the bimetal strip, as indicated in Fig. 7. A second terminal screw 56 mounted in base 10 is provided for the joint connection of the pigtail lead 48 and a circuit lead 58.

The slidable shorting bar 40 is formed of thin, flat spring stock having a flat portion 60 overlaying the outer surface of the bimetal, and having formed edges 62 which press against the underside of the bimetal so as to bias the flat portion 60 downward against the wires 36 and 38. A silver contact bar 64 is provided and is insulated from the slide bar 40 by an insulating strip 66. The contact bar 64 is attached to slide bar 40 by a rivet 68.

The heating control circuit shown in Fig. 8 includes as primary elements; a power source comprising a step down transformer having a primary winding 72 connected by leads 74 and 76 to a commercial power source, the thermostat, and the winding 78 of an electromagnetic actuator which when energized effects operation of the furnace.

When the temperature of the space being heated drops below a predetermined temperature, the thermostat contacts 20 and 22 close, completing a circuit which starts operation of the furnace. At the same time some portion of the resistance heater 34 will be in the circuit, depending upon the position of slide bar 40, and heat will be directly applied to a portion of the outer turn of the bimetal coil.

Ordinarily, it will be required to supply heat to the bimetal strip at a rate which will raise its temperature in the order of 3° to 4° Fahrenheit in three minutes to obtain the "anticipation" required under conditions of average heat loss rate of the space being heated. The temperature to which the resistance heater will be required to be heated in order to effect the required increase in bimetal temperature in that time will depend in great part upon what portion of the heat generated in the resistance heater is transferred to and distributed along the length of the bimetal, and what portion is lost by radiation and convection, or by storage in the resistance heater and in any heat transmission means employed to conduct heat from the resistance heater to the bimetal.

In the present invention, the mass and therefore the heat storage capacity of the resistance heater and heat transmission means is reduced substantially to that of the resistance wire itself and the thin, spring metal slide bar. Moreover, heat from the resistance heater is transferred directly to a substantial portion of the length of the bimetal. This arrangement permits a substantial reduction in the required heat output rate of the resistance heater to effect the required "anticipation" by reducing the heat loss, and by reducing the heat loss and the storage thereof, the factors which effect "drooping" of the temperature control point are diminished. "Drooping" of the control point occurs when stored heat maintains the temperature of the bimetal above that of room temperature during "off" cycles of the furnace.

Inasmuch as the degree of "overshooting" of the space temperature will vary as between heating system installations as well as with the average space heating load, it is necessary to vary the local heating of the thermostat, or "anticipation," to meet the requirements. This is accomplished by moving the slidable shorting bar 40 along the wires 36 and 38 to increase or decrease the resistance and, therefore, the heat output of the resistance heater. To increase the heat output in a given circuit, the bar 40 is moved in a direction to shorten the total length of the wires 36 and 38, which are in circuit. Usually the correct adjustment is determined by measuring the time required to effect opening of the thermostat.

While I have shown a pair of parallel lengths of wire to be variably shorted by a sliding bar, it is obvious that a single length of wire may be used and a sliding bar provided which would ground the wire to the bimetal at selected points therealong. It may also be desirable to clamp the sliding contactor in an adjusted position to avoid inadvertent movement, or to increase the contact pressure between it and the wires, by screw threaded means instead of relying upon the tension of the formed ends 62. It will be noted that the circuit extends from the lower end of wire 38 through a portion of the outer turn of the bimetal strip. It is to be understood that the resistance of the bimetal due to its cross-sectional area is such that no appreciable rise in the temperature of the strip results from extending the circuit through this portion of the bimetal.

The foregoing description is intended to be illustrative and not limiting, the scope of the invention being set forth in the appended claims.

I claim:

1. In a device of the class described, an elongated temperature responsive element, and means for variably heating said element electrically comprising a pair of elongated flexible electrical conductors lying against said element and coextending in spaced parallel relationship along said element, said conductor being mechanically connected at both ends to said element, circuit connections for connecting two adjacent ends of said conductors across a source of electrical energy, and a transverse for shorting bar overlaying said conductors and being mounted for slidable adjustment on said element.

2. In a device of the class described, a bimetal strip, and a variable resistance electrical heater for heating said strip comprising a pair of elongated, flexible, electrical conductors lying in spaced relationship against one face of said strip and coextending along a portion of the length of said strip, circuit connections for connecting two adjacent ends of said conductors across a source of electrical energy, and a member mounted on said strip for adjustable positioning therealong and including a transverse electrical conductor overlaying said first-mentioned electrical conductors.

3. In a device of the class described, a spirally wound bimetal strip, and a variable resistance electrical heater for directly heating a portion of said coil near its outer end comprising two spaced parallel lengths of flexible electrical conductor lying against the outer face of said coiled strip and coextending along a portion of the outer turn of said coil, circuit connections for connecting adjacent portions of said lengths of conductor at one end thereof across a source of electrical energy, and a member slidably mounted on said coiled strip and including a conductive shorting bar overlaying said parallel lengths of conductor.

4. In a space thermostat, a bimetal strip anchored at one end and having a free end operative to make and break an electrical circuit in response to directional temperature change, and variable resistance means for electrically heating said strip slightly under certain operative conditions comprising two spaced parallel lengths of flexible electrical conductor lying against one face of said strip and coextending along an intermediate portion of the length of said strip, means for mechanically connecting both ends of said parallel lengths of conductor to said strip, circuit connections for connecting adjacent portions of said parallel lengths of conductor at one end thereof across a source of electrical energy, said circuit connections including the portion of said strip lying between said adjacent end portions of said parallel lengths of conductor and the free end of said strip, and a shorting bar adjustably mounted on said strip for adjustable positioning along said parallel conductors and including a transverse contact bar overlaying said parallel conductors.

5. In a space thermostat, an electrical circuit including a source of electrical energy, a spirally coiled strip of bimetal anchored at its inner end and having a free outer end, said bimetal strip being wound with the lamination having the highest coefficient of expansion on the outside and said free end of said coil having contact means thereon for completing said circuit in response to decreasing temperature and for breaking said circuit in response to increasing temperature, a variable resistance heater for slightly heating said coil when in a circuit closing position comprising an elongated flexible conductor lying against the outer surface of said strip and extending along a portion of the outer turn of the coil, said conductor being mechanically connected at its ends to said strip and being electrically insulated therefrom along its length, circuit connections for connecting varied portions of the length of said conductor into said circuit, said circuit connections including a portion of said strip at its outer end, and a member slidably mounted on said strip for contacting said conductor at selected points along its length.

6. In a space thermostat, a spirally wound strip of bimetal wound with the lamination having the highest coefficient of expansion on the outside, said coil being anchored at its inner end and having a contact at its outer free end for completing a circuit when the strip responds to a decrease in temperature, means for heating said strip slightly when in a circuit closing position comprising an elongated flexible conductor lying against the outer surface of said strip and extending along a portion of the length of said strip, said conductor being mechanically connected to said strip at its ends and electrically insulated therefrom at one end and along the length thereof, and electrically connected thereto at its other end, and circuit connections for connecting said conductor across a source of electrical energy including a portion of said strip near its outer end and said contact.

References Cited in the file of this patent

UNITED STATES PATENTS

| 1,597,719 | Burnham | Aug. 31, 1926 |
| 2,250,135 | Lindemann | July 22, 1941 |
| 2,262,341 | Shaw | Nov. 11, 1941 |
| 2,347,014 | Willmann | Apr. 18, 1944 |

FOREIGN PATENTS

| 118,097 | Switzerland | Dec. 16, 1926 |
| 309,979 | Great Britain | June 11, 1928 |